United States Patent [19]

Heinz

[11] 4,427,497
[45] Jan. 24, 1984

[54] METHOD FOR MAKING UNITARY, HOLLOW STRUCTURES

[75] Inventor: Theodore A. Heinz, Simi Valley, Calif.

[73] Assignee: Rockwell International Corporation, El Segundo, Calif.

[21] Appl. No.: 226,307

[22] Filed: Jan. 19, 1981

[51] Int. Cl.³ .......................... C25D 5/48; C25D 7/08
[52] U.S. Cl. ....................................... 204/16; 204/19; 204/35 R
[58] Field of Search .................... 204/16, 35 R, 11, 19

[56] References Cited

U.S. PATENT DOCUMENTS

| 2,962,811 | 12/1960 | Herbert, Jr. | 204/16 |
| 3,242,565 | 3/1966 | North | 204/16 |
| 3,520,357 | 7/1970 | Bruner | 204/11 |

Primary Examiner—T. M. Tufariello
Attorney, Agent, or Firm—H. Fredrick Hamann; Harry B. Field

[57] ABSTRACT

A method is disclosed for making unitary hollow structures of different kinds and shapes with a minimum of complex machining. The hollow structure is initially formed by application of open work mesh or cloth to a supporting structure such as a honeycomb structure. Material is then deposited on the mesh and within the cavity in a continuous process to build up a deposit layer lining the cavity and fully embedding the mesh to close the cavity, the deposit layer also bonding the mesh and the supporting structure. A novel fluid cooled mirror structure of unitary construction and homogeneous composition is made by the method of this invention.

14 Claims, 6 Drawing Figures

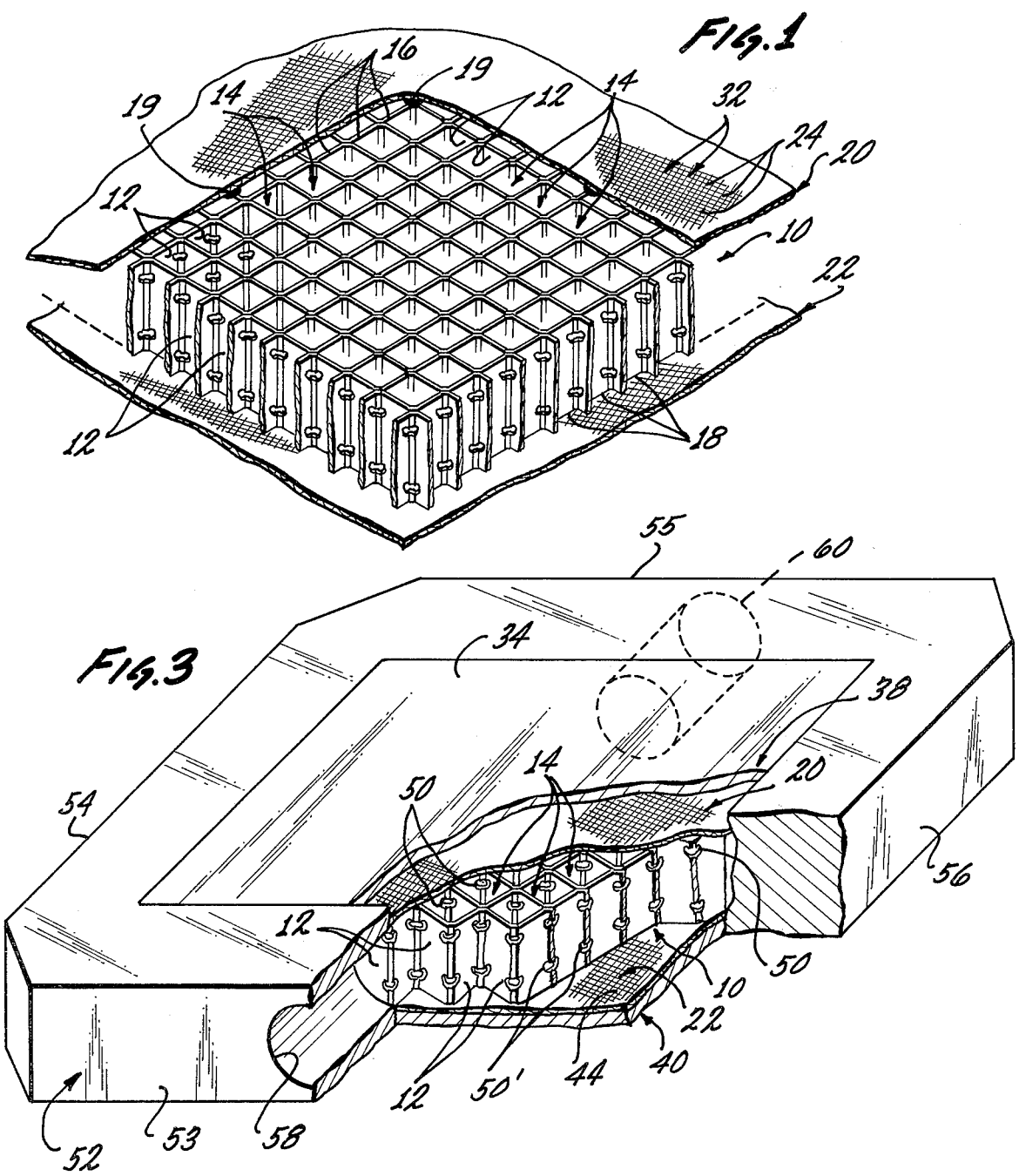

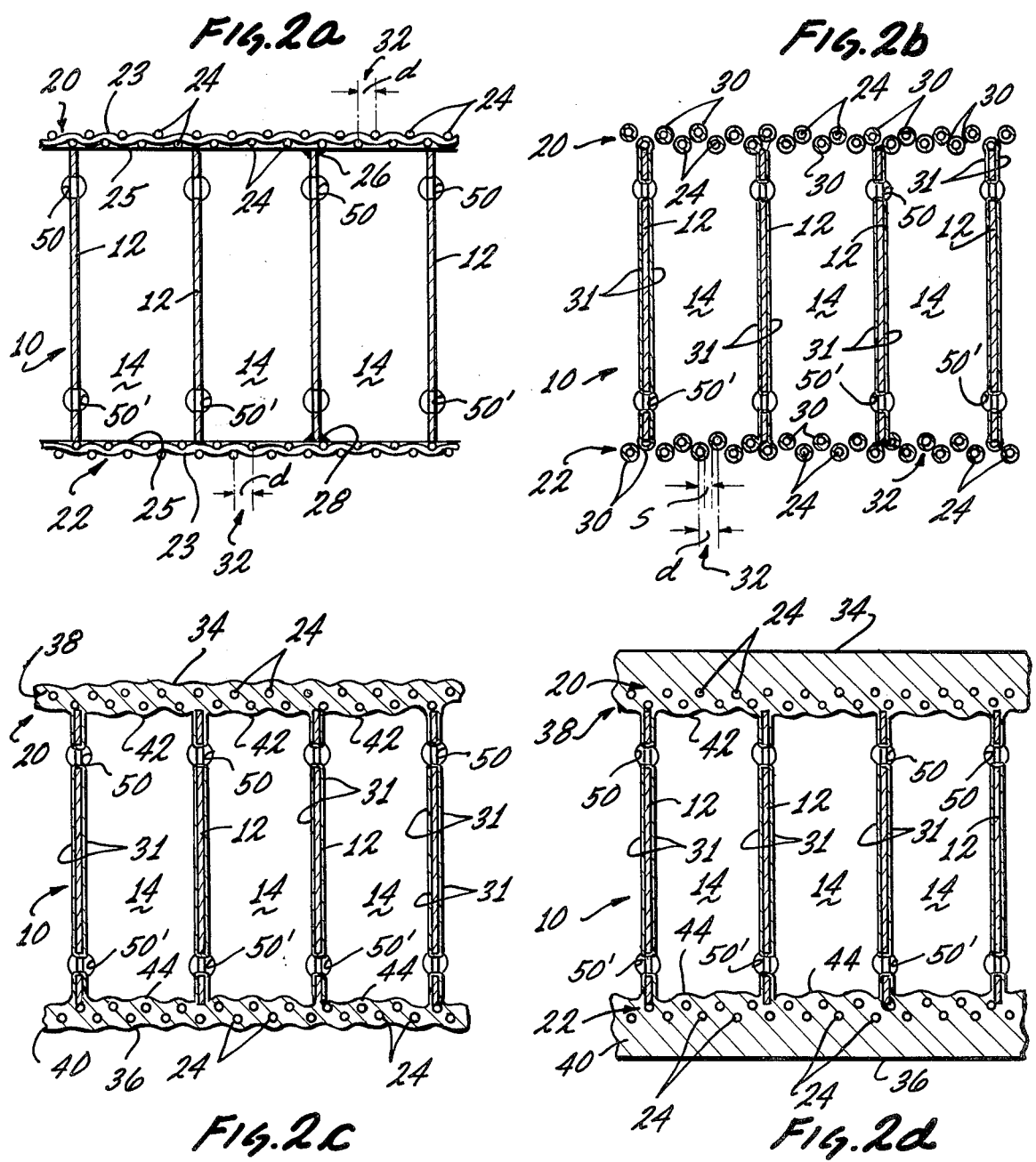

METHOD FOR MAKING UNITARY, HOLLOW STRUCTURES

BACKGROUND OF THE INVENTION

1. Field of the Invention

This invention relates generally to structural materials and more particularly to a method for making hollow unitary structures which may be of homogeneous composition. A novel fluid cooled unitary mirror structure for reflecting high intensity coherent electromagnetic radiation is disclosed as one product of the method of this invention.

2. State of the Prior Art

Various methods have been used in the past for the manufacture of hollow structures, resulting in the production of a wide variety of hollow, relatively lightweight structures.

Prior art relevant to the particular mirror structure described herein includes the sandwich panel structures made by laminating a low density cellular or honeycomb core structure between a pair of outer surface sheets or skins. Such panels are largely hollow and therefore lightweight, but possess a high stiffness-weight ratio. In the past, both the cellular core and the outer face sheets were prefabricated and then bonded to make the structural panel. Typically the bonding was achieved by either use of adhesive or by the welding or brazing together of the component parts.

Thus U.S. Pat. No. 2,814,717 to Hardesty issued Nov. 26, 1957, teaches a method of resistance welding for securing thin sheet metal to a supporting core structure.

U.S. Pat. No. 2,609,068 to Pajak issued Sept. 2, 1952, and U.S. Pat. No. 2,952,579 to Merriman issued Sept. 13, 1960, both disclose methods of adhesively bonding a metal foil honeycomb core between a pair of outer sheets.

U.S. Pat. No. 2,962,403 to Jones issued Nov. 29, 1970 discloses a structural panel made by laminating, by means of adhesive, an intermediate honeycomb core and a pair of outer wire screen facings.

Applicant is further aware of the following patents relevant to methods of electro-deposition of material on a mesh or other apertured structure:

U.S. Pat. No. 2,529,237 to Turner issued Nov. 7, 1950 teaches open work electrodes, including wire mesh, for the electro recovery of metals. The open work electrode is embedded in a deposit of metal resulting in a solid slab of material. The use of thin mesh of a suitable material made it unnecessary to separate the much larger mass of recovered metal from the electrode, which separation had been a source of difficulties until then. Also, the mesh could be made of the same metal and degree of purity as the recovered metal thus being essentially indistinguishable therefrom.

U.S. Pat. No. 3,686,089 to Butter et al. discloses a method for embedding structural reinforcing material in a matrix produced by electroplating means.

U.S. Pat. No. 1,323,167 to Denny issued Nov. 25, 1919 teaches the production of reinforced metal elements formed by electroplating a relatively soft metal onto a perforated foundation of more rigid metal. The covering metal fills the perforations and is thereby mechanically locked to the foundation.

The use of adhesives to achieve a hollow lightweight structure as described in the referenced patents does not produce a highly reliable joint between the core and the outer face sheets, particularly under difficult environmental conditions. In some situations, it may be desirable to immerse the structure in a fluid or expose it to extreme temperatures, either of which would tend to weaken the adhesive bond.

Welding methods of assembly are difficult, particularly where complex structures are attempted or where any portion of the structure includes thin metallic foils such as are often used in lightweight honeycomb structures. Welded joints often have hidden defects which are not readily apparent until a structural failure occurs.

It is, therefore, one object of this invention to provide a method of making hollow structures of unitary construction without use of adhesive bonding or welding.

It is another object of this invention to provide a method of making hollow structures including complex internal manifolds and cavities requiring less difficult and costly machining techniques.

It is yet another object of this invention to provide a method of making complex hollow structures of unitary construction and homogeneous composition.

It is a further object of this invention to provide a method of making lightweight structures of superior structural and dimensional stability and reliability under a wide range of adverse environmental conditions.

It is another object of this invention to provide a method of making hollow structures of unitary construction having internal structural elements and external wall surfaces, which method allows wide latitude of control over a continuous range of the thickness of the internal structural elements relative to the exterior walls of the hollow structures.

It is an additional object of this invention to provide a method of making fluid cooled structures of unitary construction and homogeneous composition having internal manifolds for circulating fluids.

It is also an object of this invention to disclose a method of making hollow, arbitrarily complex structures of unitary construction and homogeneous composition of a wide variety of materials.

It is a further object of this invention to provide a fluid cooled mirror structure of unitary construction and homogeneous composition for use at high temperatures.

It is another object of this invention to provide a fluid cooled mirror structure of unitary construction having superior thermal transfer characteristics and low thermal mass.

It is yet another object of this invention to provide a fluid cooled mirror structure having superior optical and dimensional stability over a wide temperature range.

SUMMARY OF THE INVENTION

According to the method of this invention an open work mesh or cloth of interweaved strands is applied to a supporting structure to define a cavity therebetween. Material from a source external to the cavity is deposited on the mesh, a portion of the material passing through the openings between the interweaved strands into the cavity which portion is deposited on the cavity walls defined in part by the supporting structure and in part by the inner surface of the mesh. The cavity is closed such that material can only enter through the open work mesh. In the initial stage of the process a deposit is built up lining the cavity walls and extending uninterruptedly over both the supporting structure and the mesh strands adjacent to the supporting structure, thereby bonding the mesh and the supporting structure.

Material is built up on the mesh strands until the openings therebetween are fully closed to form a solid wall closing the cavity, preventing further entry of material into the cavity and stopping the deposition process therein at a given deposit thickness.

As the process continues beyond this point, material is deposited only on the outer surface of the mesh, increasing the thickness of the deposit thereon and fully embedding the mesh. This external deposit may be increased to any thickness consistent with the particular deposition process and may be a multiple of the thickness of the internal deposit lining the cavity.

The thickness of the deposit formed within the cavity is directly related to the mesh aperture all other factors being constant. Thus, if the mesh is very fine and therefore has small apertures, the deposit will tend to embed the mesh and close the apertures more rapidly than would be the case with a mesh having more widely separated strands or wires.

The invented method can be practiced in particular for making a fluid cooled mirror structure suitable for reflecting high intensity radiation, such as a laser beam. The entire mirror structure is of homogeneous composition to minimize optical distortion by uneven expansion of the structural elements at high temperatures, and is of integrated unitary construction to achieve a very high degree of structural reliability by avoiding adhesively bonded or welded joints.

The mirror structure is itself novel and comprises a frontal mirror element, a rear wall and an intermediate cellular core structure. The cellular core is formed by cell walls extending between the mirror element and the rear wall. The cell walls are perforated to allow coolant fluid to circulate through the core in direct contact with the inner surface of the frontal mirror element. Advantage is taken of the method of this invention to make the cell walls thin compared to the thickness of the mirror element to minimize the thermal mass and weight of the core, without sacrifice in the rigidity and optical stability of the mirror structure.

The method disclosed herein may be practiced with a variety of materials which may be deposited in molecular form from a solution or condensed from a vapor, or collected in the form of droplets or particles sufficiently small to pass through the mesh apertures. Yet other methods of deposition will become apparent. By way of example only, a preferred embodiment is described below wherein a metal is electroplated onto a metallic mesh and supporting structure.

BRIEF DESCRIPTION OF THE DRAWINGS

FIG. 1 shows in fragmentary perspective view the low density cellular core intermediate the upper and lower open work mesh sheets.

FIG. 2 is a sequence showing in magnified cross sectional detail the deposition process whereby the mesh and the supporting core structure are embedded.

FIG. 3 is a broken-away perspective view of the novel mirror structure made by the method of this invention.

DETAILED DESCRIPTION OF THE INVENTION

The method of the invention is described in connection with the manufacture of a laser mirror structure.

All numbers in the drawings refer to portions of the finished mirror structure of FIG. 3.

FIG. 1 of the drawings shows a cellular core or honeycomb 10 including a plurality of vertical solid cell walls 12 defining an array of cell cavities 14 which extend through the core 10. The cell walls 12 terminate in upper edges 16 and lower edges 18. The upper edges 16 collectively define an upper planar core surface while the lower edges 18 collectively define a lower planar core surface parallel to the upper core surface, both these core surfaces being perpendicular to the vertical cell walls 12. Although the cell cavities 14 are shown to be four sided, it is understood that a greater or lesser number of sides may be included.

An upper mesh 20 of open work is formed by interweaved or crossed wires or strands 24 with open spaces 32 therebetween to form a screen structure of planar configuration. The upper mesh 20 is supported by the hollow core structure 10 coextensively with the surface defined by the upper edges 16 such that the mesh overlies the cell cavities 14 and forms an upper end wall therefor. The lower mesh 22 is a similar structure and is supported on the lower core surface defined by lower edges 18 to form an opposite end wall for the cell cavities 14 parallel to the upper mesh 20. The mesh sheets 20 and 22 may be secured to the cellular core 10 by a variety of methods, preferably by spot welding to the upper and lower cell wall edges 16 and 18 at a few points 19. It will be understood that other methods of temporary attachment may be resorted to, or such attachment may be dispensed with altogether as it is not essential to the method of this invention. All that is required is that the mesh be in close proximity to the cell wall edges 16, 18 during the deposition process described below.

Turning to FIG. 2 of the drawings, a four step sequence illustrates the deposition process whereby a solid continuous deposit layer of material is built up, simultaneously embedding the core structure and the mesh. According to the preferred embodiment, both the cell walls 12 of the core structure 10 and the mesh sheets 20, 22 are of metallic composition and the deposit material is also a metal deposited thereon by electroplating methods in a plating solution or bath.

FIG. 2a shows in enlarged fragmentary cross-section the cell walls 12 and the mesh wires 24 forming the upper and lower mesh sheets 20, 22. Each mesh sheet 20, 22 defines an outer mesh surface 23 and an inner mesh surface 25. The mesh sheets are spot welded to the core wall at a point 26 for the upper mesh and point 28 for the lower mesh. The inner mesh surfaces 25 of the upper and lower mesh 20, 22, together with the core walls 12 define the cell cavities 14 extending through the core 10.

In FIG. 2b the core-mesh assembly of FIG. 2a has been immersed in a plating solution and a plating current is passed by connecting the metallic core structure and the mesh sheets to a source of electrical potential. As a result metallic material commences to build up a deposit layer on all surfaces bathed by the plating solution, gradually enlarging the cross-section of wires 24 as well as increasing the thickness of core walls 12.

Initially, the mesh 20, 22 has openings or apertures 32 defined by the interweaved wires or strands 24, the apertures being of dimension d in FIG. 2a. As the deposit 30 encapsulates the wires 24 the open space between the wires is filled in to a reduced dimension S as in FIG. 2b and eventually the apertures 32 in the mesh are completely closed as in FIG. 2c.

Initially and prior to closure of the mesh apertures 32 the electro-deposition of material on the mesh-core assembly proceeds approximately at an even rate within cavities 14 and on the surfaces of the upper and lower mesh sheets 20, 22. Thus, as the mesh wires 24 are encapsulated in deposit 30, a deposit 31 of similar thickness is formed on the surfaces of walls 12, lining the cell cavities 14.

As deposition of material proceeds the individual deposits 30 encapsulating individual wire strands 24 increase in size until adjacent deposits 30 merge together, closing the mesh openings 32. This stage in the process is illustrated in FIG. 2c where deposits 32 on upper mesh 20 have merged, to form a continuous upper face sheet or wall 38 having an outer surface 34 and an inner surface 42. The lower mesh 22 is also embedded in a continuous lower face deposit or sheet 40 having an outer surface 36 and an inner surface 44. The upper and lower face sheets 38 and 40 are integral and continuous with the deposits 31 on the cell walls 12, bonding together the upper and lower mesh sheets 20, 22 and the cellular core 10 to form a unitary hollow structure. At this stage the cell cavities 14 become closed against influx of the plating solution and consequently plating within cavities 14 ceases for lack of replenishment of the plating solution contained therein. The thickness of deposits 31 on the surfaces of walls 12 lining cavities 14 is fixed at this point. The thickness of the face deposits or sheets 38, 40 as measured inwardly from the respective upper and lower mesh 20, 22, i.e. that portion of the face deposits 38, 40 formed on the inner mesh surfaces 25, is also fixed since no further material is deposited on the inner surfaces 42, 44 of the face deposits.

Material continues to be deposited, however, on the exterior surfaces 34, 36 of upper and lower face deposits 30, 40. The face deposits 38, 40 are built to any desired thickness which may exceed considerably the thickness of the deposits 31 formed within cavities 14. Thus as seen in FIG. 2d in the completed unitary structure the mesh layers 20, 22 lie embedded near the inner surfaces 42, 44. Initially the outer surfaces 34, 36 of the face deposits 30, 40 will be irregular and will retain the pattern of the embedded mesh sheets 20, 22, as in FIG. 2c. As the deposition process is continued the mesh pattern is fully embedded in a thicker deposit to produce with subsequent machining relatively smooth outer surfaces 34, 36 as in FIG. 2d. The inner surfaces 42, 44 however retain the mesh texture because deposition on these surfaces within cavities 14 ceases at an earlier stage in the process. When the desired deposit thickness is achieved the electroplating process is stopped and the structure is removed from the plating bath. The plating solution is drained from the closed cells 14 through openings 50 and 50′ in cell walls 12.

By choosing substantially identical materials for the mesh, the core structure and the deposit material, the entire unitary structure may be made of substantially homogeneous composition such that the component parts become essentially indistinguishable for practical purposes. For example, the core 10 and the mesh sheets 20, 22 may be made of either nickel, copper, or silver, with the same metal being deposited thereon. Such a homogeneous structure has superior dimensional characteristics over a wide temperature range because all structural elements expand and contract at a uniform rate, thus tending to minimize buckling and distortion of the structure.

These and other advantages of the method of this invention find application in a novel fluid cooled mirror structure suitable for use at high temperatures. The mirror structure is shown in FIG. 3 of the drawings, and includes a cellular core 10 intermediate an upper mesh screen 20 and a lower mesh 22. The upper and lower mesh sheets 20, 22 have been embedded in a deposit by the above-described method within upper and lower face sheets deposits 38, 40 and bonded thereby to the cellular core 10. The cell walls 12 of the core 10 have formed therein perforations or holes 50 communicating adjacent cell cavities 14. The openings 50 in combination with the cavities 14 define a fluid path for circulating a coolant fluid through the cellular core 10.

The upper face deposit 38 in FIG. 3 has been broken away to expose a portion of the upper mesh 20 and a portion of the cellular core 10. The perforations or holes 50 in the cell walls 12 of the cellular core 10 communicate adjacent cell cavities 14 such that fluid may be circulated through the mirror core. As shown in FIG. 3 the openings 50 are preferably arranged on cell walls 12 to define a first plane parallel to the upper face deposit 38 and in proximity thereto to circulate coolant fluid over the inner surface 42 of the upper face deposit. The openings 50′ may further define a second plane parallel and proximal to the lower face deposit 40 for circulating fluid over its inner surface 44.

The entire core assembly is surrounded by a frame 52 shown broken away in FIG. 3, for containing fluid within the core. The frame 52 includes four side walls 53, 54, 55, and 56, each side wall extending between the upper face deposit 38 and the lower face deposit 40. The wall 53 includes a fluid inlet such as bore 58 through which fluid is directed into the core 10 and a fluid outlet or bore 60 is provided in the opposite wall 55 through which the fluid may flow out of the core 10. The frame 52 also serves as a holder or jig during the electroplating process to enclose the core cavities 14 and thus prevent the plating solution from flowing into the cell cavities 14 through openings 50, such that the plating solution can only flow in through the mesh sheets 20, 22.

The bores 58 and 60 in side walls 53 and 55 respectively are preferably closed during the electroplating process so that the plating solution is replenished only through the mesh apertures. After the plating process is completed and the face deposits 38, 40 are fully formed, the bores 58 and 60 are opened for draining the plating solution trapped within the cavities 14. The openings 50, 50′ also serve as drain openings for emptying the individual cell cavities 14. It will be appreciated that such drain apertures 50, 50′ must be provided since the individual cells 14 would otherwise be completely closed after formation of the face deposits 38, 40.

The outer surface 34 of the completed upper face deposit 38 is then polished to form a mirror surface for reflecting electromagnetic radiation such as high intensity beams of coherent radiation. As the upper face sheet 38 is heated by the incident radiation, heat is transferred directly to the underlying body of coolant fluid circulating through the cell cavities 14. If desired, the outer surface 36 of the lower face deposit or rear wall 40 may also be polished to form a second mirror surface.

It will be appreciated that each of the face deposits 38 and 40 is of considerably greater thickness than the combined thickness of the cell walls 12 and the cell wall deposits 31, such that the core interior is of relatively low density and low weight. Further, the amount of mass constituting the core is greatly diminished relative to the mass of the upper and lower face sheets 20, 22 so as to minimize the thermal mass of the core. The stationary structural mass within the core 10 is thus minimized and the overall effect is to approach an ideal state where the frontal mirror element or upper face deposit 38 is floating on a continuous body of circulating fluid in direct contact with its inner surface 42. Due to the low mass of the core walls 12, little heat is retained within the core structure, providing for highly efficient cooling of the frontal mirror element 38.

A considerable degree of control may be exercised over the relative thickness of the deposit 31 lining the cell walls and the thickness of the face deposits 38 and 40. The thickness of the internal deposit 31 is directly related to the aperture d of the mesh openings 32. For a given rate of material deposition, the greater this aperture, the longer the time required to close the mesh openings thus extending the build up of material within the cavities 14. By selecting a suitable mesh the deposit thickness within cavities 14 can be made small compared to the thickness of the face deposits 38 and 40 or conversely can be of nearly the same thickness. The mesh may be selected from a variety of mesh gages having different sized apertures. In general, a fine mesh woven wire cloth such as two hundred (200) mesh, having a wire thickness of 2/1000ths of an inch may be used.

For best optical quality the mirror structure of this invention is preferably constructed with a core density in excess of 10% (ten percent) and face sheets having a thickness greater than 0.08 inches.

Although the described mirror structure has been chosen by way of example, many other types of hollow unitary lightweight structures may be made by the method of this invention, particularly structures that are subject to extreme environmental conditions.

It will be apparent to those skilled in the art that the method of this invention may be practiced by depositing material other than by electroplating. For example, the material may be deposited on the mesh and core assembly from a vapor, either in a vacuum or in a gas atmosphere. Yet another possibility is the deposition of very small particles or droplets of material which are subsequently fused as by heating to form a solid continuous deposit embedding the mesh and at least part of the supporting structure.

What is claimed is:

1. A method for making an arbitrarily shaped hollw unitary structure, comprising the steps of:
   applying an apertured mesh having inner and outer surfaces to a supporting structure to define a cavity;
   electroplating a deposit onto said mesh and said supporting structure in a plating solution, such that said deposit is initially formed on both said outer and inner surfaces of said mesh and on said supporting structure within said cavity, thereby bonding said mesh and said supporting structure until said mesh apertures are closed by said deposit, at which point said electroplating substantially ceases within said cavity, but said deposit continues to be formed on said outer surface of said mesh to a desired thickness.

2. The method of claim 1 wherein said mesh, said supporting structure and said deposit are of substantially homogeneous metallic composition.

3. The method of claim 1 wherein said mesh, said supporting structure and said deposit are all of substantially identical composition whereby said unitary structure is of homogeneous composition.

4. The method of claim 1 further comprising the step of substantially closing said cavity against fluid influx except for fluid passing through said apertured mesh.

5. The method of claim 4 further comprising the step of opening fluid outlet means in said hollow unitary structure, and draining said plating solution from said cavity.

6. The method of claim 1 or claim 4 wherein said supporting structure is a honeycomb core having cell walls defining a plurality of open cell cavities extending through said core.

7. The method of claim 6 wherein said honeycomb core has an upper and a lower surface, said cell cavities extending transversely therebetween and communicating through openings in said cell walls such that fluid may be circulated through said core, and wherein said step of applying mesh further comprises:
   applying said mesh to both said upper surface and said lower surface such that said deposit forms upper and lower face sheets closing said cell cavities.

8. The method of claim 1 wherein said deposit continues to be formed on said outer surface of said closed mesh until a desired thickness is obtained.

9. A method for making a fluid-cooled mirror structure, comprising the steps of:
   forming a honeycomb core having an upper surface, a lower surface, and cell walls defining cell cavities extending between said upper and lower surfaces;
   perforating said cell walls to form openings communicating adjacent cell cavities for circulating fluid through said honeycomb core;
   applying an apertured mesh to said upper surface, said mesh having an outer surface and an inner surface; and
   electroplating said mesh and said honeycomb core in a plating solution such that a deposit is formed on both surfaces of said mesh and on said cell walls to bond said mesh and said honeycomb, said electroplating continuing until said apertured mesh is fully closed by said deposit and is embedded therein so that said deposit forms a face sheet of desired thickness.

10. The method of claim 9 further comprising the step of applying an apertured mesh to said lower surface prior to said electroplating step.

11. The method of claim 12, wherein said cell walls are thin relative to the desired thickness of said deposit embedding said mesh, and further comprising the step of:
   closing said honeycomb core against influx of said plating solution, except for passage thereof through said mesh, whereby the electroplating of said cell walls and said inner mesh surface within said cavities stops when said apertured mesh is closed by said deposit, the electroplating continuing thereafter on the outer surface of said closed mesh to build face sheet deposits of said desired thickness whereby said cell walls together with said deposit formed on said cell walls remain relatively thinner than said face sheet deposits.

12. The method of claim 11 further comprising the step of opening said honeycomb core to drain said plating solution from said cavities.

13. The method of claim 9 or claim 12 further comprising the step of polishing the outer surface of at least one of said face sheets to form a mirror surface.

14. The method of claim 9, wherein said honeycomb core, said mesh, and said electroplated deposit are all of a single metal selected from the group comprising nickel, copper, and silver.

* * * * *